(12) United States Patent
Shimura

(10) Patent No.: US 10,911,609 B2
(45) Date of Patent: Feb. 2, 2021

(54) IMAGE FORMING APPARATUS, IMAGE FORMING METHOD, AND STORAGE MEDIUM

(71) Applicant: CANON KABUSHIKI KAISHA, Tokyo (JP)

(72) Inventor: Norio Shimura, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/597,821

(22) Filed: May 17, 2017

(65) Prior Publication Data

US 2017/0346957 A1   Nov. 30, 2017

(30) Foreign Application Priority Data

May 30, 2016   (JP) .................................. 2016-107865

(51) Int. Cl.
  *H04N 1/00*   (2006.01)
(52) U.S. Cl.
  CPC ..... *H04N 1/00082* (2013.01); *H04N 1/00037* (2013.01); *H04N 1/00477* (2013.01);
  (Continued)
(58) Field of Classification Search
  None
  See application file for complete search history.

(56) References Cited

U.S. PATENT DOCUMENTS 6,707,568 B1 * 3/2004 Yu .......................... G06F 3/1205
                                               358/1.1
7,273,322 B1 * 9/2007 Torii ....................... B41J 11/008
                                               358/1.12

(Continued)

FOREIGN PATENT DOCUMENTS

JP    2001-347707 A    12/2001
JP    2006-127281 A    5/2006
(Continued)

OTHER PUBLICATIONS

U.S. Appl. No. 15/597,799, filed May 17, 2017 by Sho Nakamura et al.

(Continued)

*Primary Examiner* — Mohammad H Ghayour
*Assistant Examiner* — Pawan Dhingra
(74) *Attorney, Agent, or Firm* — Venable LLP

(57) ABSTRACT

An image forming apparatus includes a memory including instructions, and at least one processor for executing the instruction to cause the image forming apparatus to act as a generation unit to perform image processing so as to generate image data including pieces of page data based on a print job, a determination unit to determine whether a piece of page data corresponding to a sheet passing a predetermined location of a conveyance path is prepared in time, and a control unit to perform, in a case where the piece of page data is not prepared in time, control to leave the sheet as a blank sheet by not performing image processing. The control unit changes a page order, determined in advance, of pages to be printed following the blank sheet in a case where it is determined the piece of page data is not prepared in time.

15 Claims, 10 Drawing Sheets

(52) U.S. Cl.
CPC ..... *H04N 1/00602* (2013.01); *H04N 1/00633* (2013.01); *H04N 2201/0094* (2013.01)

(56) References Cited

U.S. PATENT DOCUMENTS

| | | | |
|---|---|---|---|
| 8,075,211 B2 | 12/2011 | Yamamoto | |
| 8,351,056 B2 | 1/2013 | Shimura | |
| 9,183,472 B2 | 11/2015 | Kusakabe | |
| 2004/0165207 A1* | 8/2004 | Kashiwagi | H04N 1/00474 358/1.13 |
| 2004/0234303 A1* | 11/2004 | Shimizubata | G03G 15/238 399/306 |
| 2006/0092479 A1* | 5/2006 | Dohi | G06F 3/1284 358/452 |
| 2009/0027715 A1 | 1/2009 | Kuhn et al. | |
| 2009/0051107 A1* | 2/2009 | Muratani | G03G 15/6579 271/259 |
| 2013/0229684 A1 | 9/2013 | Yasuzaki | |
| 2015/0085310 A1 | 3/2015 | Yasuzaki | |
| 2015/0178602 A1* | 6/2015 | Kusakabe | G06K 15/1805 358/1.15 |
| 2015/0189103 A1 | 7/2015 | Yasuzaki | |

FOREIGN PATENT DOCUMENTS

| | | |
|---|---|---|
| JP | 2008-15609 | 1/2008 |
| JP | 2008-015609 A | 1/2008 |
| JP | 2008-191215 A | 8/2008 |
| JP | 2015-143004 A | 8/2015 |

OTHER PUBLICATIONS

U.S. Appl. No. 15/597,836, filed May 17, 2017 by Taketoshi Kusakabe et al.
Japanese Office Action dated Apr. 7, 2020, in related Japanese Patent Application No. 2016-107865 (with English translation).

* cited by examiner

IMAGE FORMING APPARATUS, IMAGE FORMING METHOD, AND STORAGE MEDIUM

BACKGROUND OF THE INVENTION

Field of the Invention

The present invention relates to an image forming apparatus that forms an image on each sheet fed continuously, an image forming method, and a storage medium.

Description of the Related Art

As a technique that is applied to a commercial high-speed printer and the like, a method is known which conveys a cut sheet fed from a sheet feed device by causing the next cut sheet to follow the preceding cut sheet. With this method, it is possible to shorten the time taken to print a plurality of pages compared to the method in which a sheet for the next page is fed after discharge of the sheet for the previous page is completed. It is desirable for a commercial high-speed printer to perform printing continuously from a viewpoint of productivity of printed matter. However, in recent years, the size of print data transferred from an external device, such as a host computer, to a printing apparatus becomes large, and therefore, the time taken for generation processing and transfer processing of print data increases. As a result of this, there is a tendency for the case to occur frequently where printing processing is obliged to suspend because the preparation of print data is not completed in time in a high-speed printer.

Japanese Patent Laid-Open No. 2008-15609 has disclosed a technique that enables the printing operation to continue without the need to suspend the printing operation during printing by inserting a skip page in the case where the generation of image data is not completed in time in a printing apparatus that performs continuous-sheet printing.

However, the technique described in Japanese Patent Laid-Open No. 2008-15609 does not take into consideration the continuous printing that is performed by continuously feeding cut sheets. Consequently, an object of the present invention is to provide an image forming apparatus capable of continuously performing printing processing without suspension even in the case where the preparation of print data is not completed in time in the continuous printing that is performed by continuously feeding sheets, an image forming method, and a storage medium.

SUMMARY OF THE INVENTION

The image forming apparatus of the present invention is an image forming apparatus including a conveyance path through which sheets are conveyed and a sheet feed device configured to continuously feed sheets to the conveyance path in accordance with a number of sheets to be fed specified by a print job, and the image forming apparatus includes a generation unit configured to generate image data based on a print job, a determination unit configured to determine whether image data corresponding to a sheet passing a predetermined location of the conveyance path is generated in time, and a control unit configured to perform, in a case where the determination unit determines that image data is not prepared in time, control to leave the sheet as a blank sheet by skipping processing to form an image for the sheet, and the control unit changes a printing order determined in advance in a case where the determination unit determines that image data is not prepared in time.

Further features of the present invention will become apparent from the following description of exemplary embodiments with reference to the attached drawings.

DESCRIPTION OF THE EMBODIMENTS

In the following, with reference to the drawings, embodiments of the present invention are explained. However, the relative arrangement of components, the shapes of apparatuses and devices and the like described in the following embodiments are merely exemplary and are not intended to limit the scope of the present invention only to those described. Further, it is assumed that the image forming apparatus shown in the following embodiments is not limited to a dedicated apparatus or device specialized in the print function, but includes a multi function peripheral that combines the print function and other functions, a manufacturing device that forms an image or a pattern on a printing medium and the like.

First Embodiment

Figure 1:
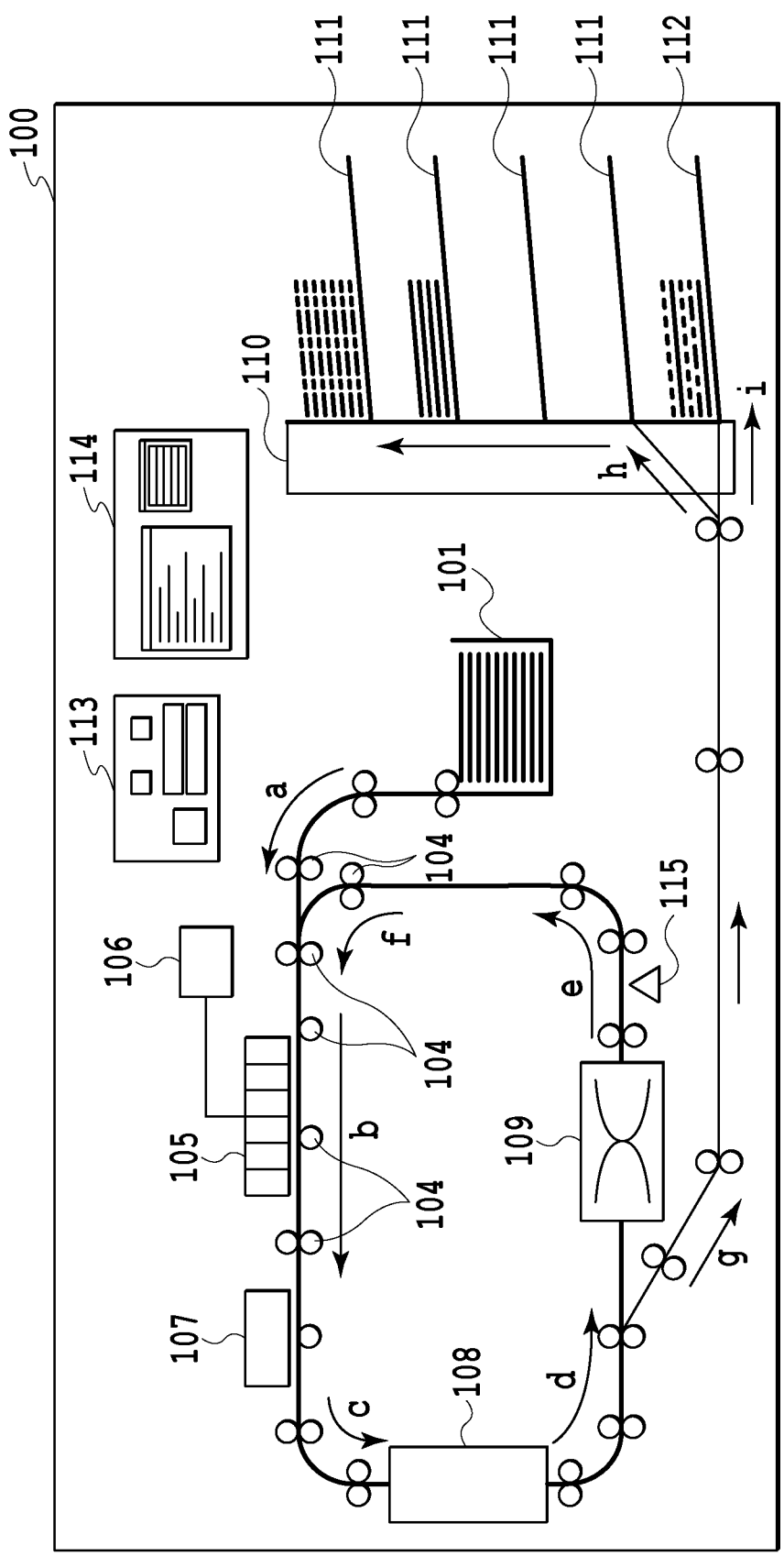
FIG. 1 is a diagram showing a configuration of an image forming apparatus according to a first embodiment of the present invention.

FIG. 1 is a diagram showing a configuration of an image forming apparatus according to a first embodiment of the present invention. In FIG. 1, a cross section diagram of an image forming apparatus 100 is shown. In the present embodiment, the image forming apparatus 100 forms (prints) an image on a cut sheet whose size has been cut to a predetermined size, such as the A4 size and the A3 size. As shown in FIG. 1, the image forming apparatus 100 includes a sheet feed device 101, a rotary roller 104 that conveys a sheet, a print head 105, and a scanner device 107. The image forming apparatus 100 according to the present invention is compatible with printing of cut sheets of a variety of sizes and types. In FIG. 1 one sheet feed device is illustrated, but the image forming apparatus 100 may have a plurality of sheet feed units. In the sheet feed device 101, a plurality of the same cut sheets (cut sheets whose size and type are the same) is set. The image forming apparatus 100 further includes an ink tank 106, a drying device 108, a sheet reversion device 109, a sort device 110, a control device 113, an operation device 114, and a sheet sensor 115. The control device 113 governs various kinds of control of the entire image forming apparatus. The control device 113 includes a controller, a user interface, and various I/O interfaces.

A sheet pulled out of the sheet feed device 101 advances in the direction of an arrow a shown in FIG. 1 by the rotary roller 104 driven by motor control and further advances in the direction of an arrow b and passes under the print head 105. The rotary roller 104 is arranged across the entire conveyance path and conveys a sheet to a predetermined location. All white circles shown in FIG. 1 represent the rotary roller 104.

The print head 105 holds independent ink jet heads corresponding to a plurality of colors (in the present embodiment, six colors) along the sheet conveyance direction. Ink is ejected from the print head 105 in synchronization with sheet conveyance and an image is formed on a sheet.

The ink tank 106 stores ink in each color independently. The ink tank 106 and the print head 105 are connected by a tube. To each ink jet head of the print head 105, a color ink corresponding to each ink jet head is supplied from the ink tank 106 via the tube. The ink tank 106 and the tube exist for each color of the ink jet head, but for simplicity, in FIG. 1, the only one ink tank and the only one tube are shown schematically.

In the print head 105, ink jet heads in the form of a line head (hereinafter, simply referred to as line heads) in respective colors (in the present embodiment, six colors) are put side by side along the conveyance direction (direction of the arrow b) at the time of printing. Each color line head may be one formed by a single nozzle chip seamlessly, or one in which divided nozzle chips are regularly put side by side in a one-line array or in a staggered array. The print head 105 in the present embodiment is a so-called full multi-head in which nozzles are put side by side in the range that covers the width of the maximum size sheet that the image forming apparatus 100 can print. The ink jet scheme in which ink is ejected from a nozzle can employ a scheme that uses heat-generating elements, a scheme that uses piezo elements, a scheme that uses electrostatic elements, a scheme that uses MEMS (Micro Electrical Machine System) elements and the like. Based on print data, ink is ejected from the nozzle of each head. The image forming apparatus 100 according to the present embodiment is not limited to an ink jet printer and can be applied to a variety of printing-scheme printers, such as a thermal printer (dye-sublimation printer, thermal transfer printer and the like), a dot impact printer, an LED printer, and a laser printer.

A sheet on which an image is formed by the print head 105 is conveyed up to the scanner device 107 by the rotary roller 104. By the scanner device 107 reading an image and a special pattern printed on the sheet, it is made possible to determine whether or not there is a problem in the printed image, or to determine the state of the image forming apparatus, such as an out-of-ink state. Further, it is possible for the scanner device 107 to read the state of the backside facing the printed side (surface) and to detect a deviation in the printing location between the surface and the backside by using a predetermined pattern.

The sheet scanned by the scanner device 107 advances in the direction of an arrow c by the rotary roller 104 and is conveyed to the drying device 108.

The drying device 108 applies heat to a sheet with warm air in order to dry a sheet to which ink is attached in a short time. Among the sheets having passed through the drying device 108, the sheet for which printing has not been completed advances in the direction of an arrow d and is conveyed to the sheet reversion device 109. The sheet for which printing has not been completed is, for example, a sheet for which an image is printed on only the surface in the case of both-side printing.

The sheet reversion device 109 reverses the surface and the backside of the sheet passing through the unit. As the method of reversing a sheet, there are a switch back method, a method of slowly twisting the conveyance path and the like. The switch back method requires the movement of a sheet to be suspended temporarily, but the method of twisting the conveyance path can keep the conveyance speed constant, and therefore, is appropriate for high-speed printing.

The sheet having passed through the sheet reversion device 109, i.e., the sheet whose surface and backside have been reversed by the sheet reversion device 109 advances in the direction of an arrow e. After this, the sheet advances in the direction of an arrow f and is conveyed again to under the print head 105.

As described above, the conveyance path (hereinafter, also referred to as a circulation path) indicated by the arrows b, c, d, e, and f in FIG. 1 is a path along which a sheet circulates and each time a sheet circulates the entire circulation path, the surface and the backside are reversed. In the following, the number of sheets that can exist simultaneously on this circulation path is referred to as the number of circulatable sheets. The number of circulatable sheets changes depending on the sheet size. For example, in the case where the number of circulatable sheets of A3 size is three, this means that it is possible to convey up to three sheets of A3 size on the circulation path at the same time.

On the other hand, among the sheets having passed through the drying device 108, the sheet for which printing has been completed advances in the direction of an arrow g without passing through the sheet reversion device 109 and is conveyed to the sort device 110. That is, in the case of one-side printing, the sheet advances in the direction of the arrow g at the branch point on the way of the first circulation of the circulation path and in the case of both-side printing, the sheet advances in the direction of the arrow g at the branch point on the way of the second circulation of the circulation path. The sort device 110 accumulates the sheet on a sheet discharge tray 111 corresponding to a tray number set for each printed image while checking the printed image by a sensor.

The sort device 110 holds a plurality of trays (in FIG. 1, five trays). The sort device 110 selects a tray on which sheets are accumulated in accordance with the setting of sheet discharge for each job or for each copy. The sort device 110 in the present embodiment includes the four sheet discharge trays 111 for discharging a sheet for which printing has been completed successfully and a sheet disposal tray 112 for disposing of a sheet used for maintenance and a sheet of poor print quality. Among the sheets sorted by the sort device 110, the sheet that advances in the direction of an arrow h is conveyed to the sheet discharge tray 111 and the sheet that advances in the direction of an arrow i is conveyed to the sheet disposal tray 112.

The operation device 114 is a unit configured for a user to check which tray the sheet on which a specific image is printed is accumulated on and a printing situation for each print job, such as a printing-in-progress situation, a printing completed situation, and a situation in which an error has occurred. Further, it is possible for a user to check the state of the image forming apparatus 100, such as the ink remaining amount and the number of remaining sheets via the operation device 114. Furthermore, a user performs maintenance, such as head cleaning, via the operation device 114. The operation device 114 includes, for example, a display and a mouse.

The sheet sensor 115 determines whether or not a sheet within the path has reached the location of the sheet sensor 115. In the present embodiment, in the case where the tip end (tip end in the advance direction) of the sheet that circulates the path has reached the location of the sheet sensor 115, sheet feed from the sheet feed device 101 is prohibited until the rear end (rear end in the advance direction) of the sheet passes the location of the sheet sensor 115. It may also be possible to arrange a plurality of the sheet sensors 115 and to change the location of the sensor to be used for determination depending on the size of a sheet to be printed and the conveyance speed.

Figure 2:
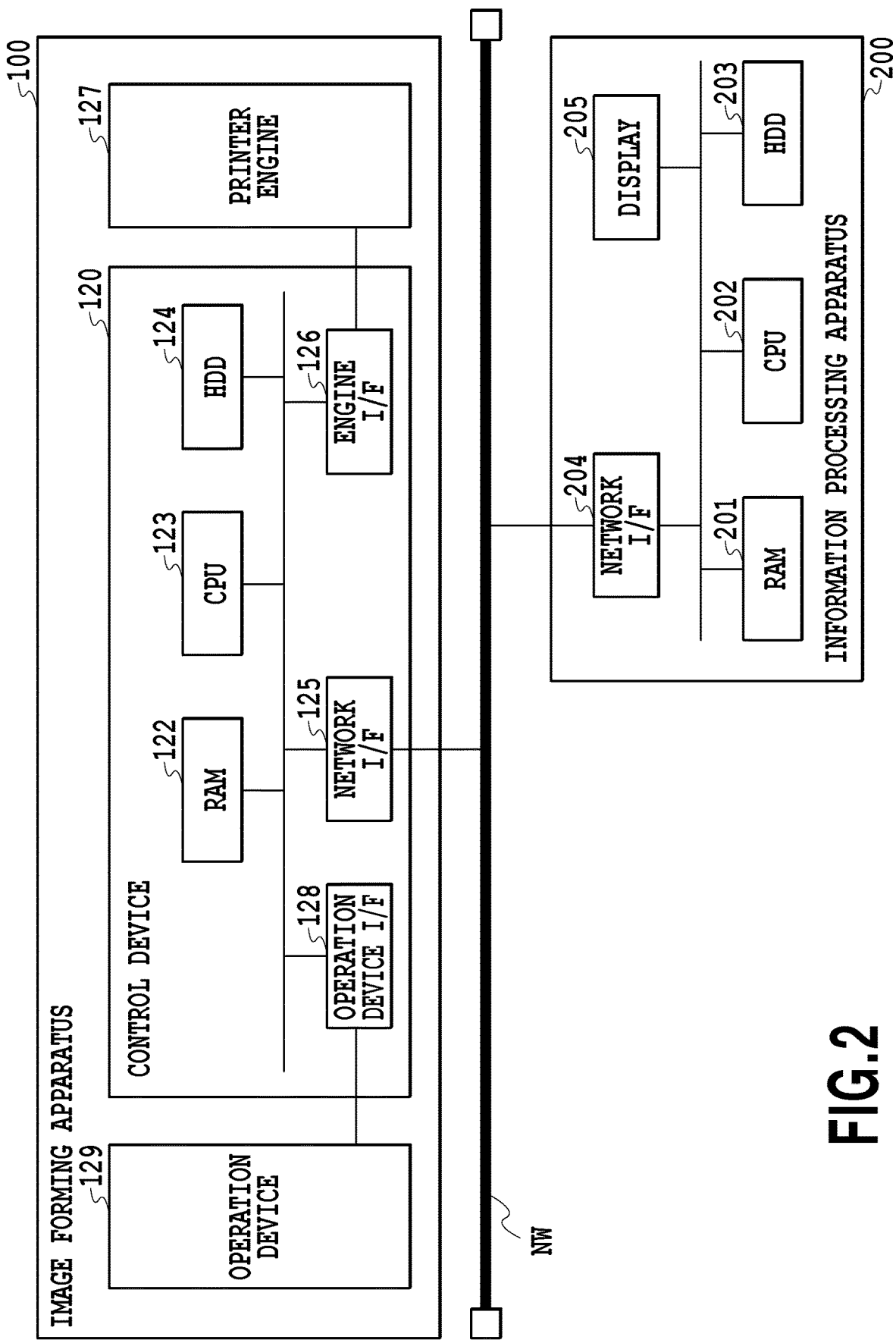
FIG. 2 is a diagram showing a hardware configuration of the image forming apparatus and an information processing apparatus according to the first embodiment.

FIG. 2 is a diagram showing a hardware configuration of the image forming apparatus 100 and an information processing apparatus 200 according to the present embodiment. The image forming apparatus 100 of the present embodiment includes a control device 120 (corresponding to the control device 113 shown in FIG. 1) configured to govern various kinds of control of the image forming apparatus 100, and a printer engine 127. Further, the control device 120 includes a RAM 122, a CPU 123, an HDD 124, a network I/F 125 ("I/F" means interface), an engine I/F 126, and an operation device I/F 128. The printer engine 127 is connected with the control device 120 via the engine I/F 126. An operation device 129 (corresponding to the operation device 114 shown in FIG. 1) is connected with the control device 120 via the operation device I/F 128. As will be described later, the image forming apparatus 100 and the information processing apparatus 200 are connected also by a print data dedicated line, in addition to via a network I/F.

The RAM 122 is a volatile memory and onto which programs of each function block stored in the HDD at the time of power on are developed. Further, the RAM 122 is used as a primary storage area to store information that is read and written at a high speed in each function block. The RAM 122 stores print data (image data) transmitted from the information processing apparatus 200, print data for which processing has already been performed and which is transmitted to a print engine unit and the like. The CPU 123 is a calculation processor that executes the programs of each function block developed onto the RAM 122. The HDD 124 is a storage device capable of storing a large amount of information and is used as a secondary storage area to store the programs of each function block and application data. The network I/F 125 performs communication with the information processing apparatus 200 via a network NW. The engine I/F 126 outputs image data in a format dependent on the printer engine 127 to the printer engine 127. The printer engine 127 drives each unit shown in FIG. 1 and drives a sheet feed mechanism, such as the rotary roller 104, as well as printing an image on a sheet based on the image data and feeds a sheet from the sheet feed device 101 to the conveyance path. The operation device I/F 128 performs communication with the operation device 129. The operation device 129 is capable of receiving input instructions by a user operation as described above and also functions as a display unit configured to present the discharge destination tray of a sheet and the state of the image forming apparatus 100, such as the printing-in-progress state, the printing completed state, and the state where an error has occurred.

The information processing apparatus 200 includes a RAM 201, a CPU 202, an HDD 203, a network I/F 204, and a display 205. The RAM 201 is a volatile memory and onto which the programs of each function block stored in the HDD 203 at the time of power on are developed. Further, the RAM 201 is used as a primary storage area to store information that is read and written at a high speed in each function block. The CPU 202 is a calculation processor that executes the programs of each function block developed onto the RAM 201. The HDD 203 is a storage device capable of storing a large amount of information and is used as a secondary storage area to store the programs of each function block and application data. The network I/F 204 performs communication with the image forming apparatus 100 and another information processing apparatus (not shown schematically) via the network NW. The display 205 displays an image at the time of power on and activation of application. Further, it is possible for the display 205 to display an image that is printed by the image forming apparatus 100.

The information processing apparatus 200 according to the present embodiment issues a print job to the image forming apparatus 100. Further, the information processing apparatus 200 generates image data to be printed. Image data for printing is, for example, common bitmap data. It is possible for the information processing apparatus 200 to generate intermediate data and the above-described bitmap data by receiving PDL data input by another information processing terminal (not shown schematically) and interpreting a drawing command of the PDL. That is, the information processing apparatus 200 according to the present embodiment plays a role of RIP (Raster Image Processing) in the printing system shown in FIG. 2.

Figure 3:
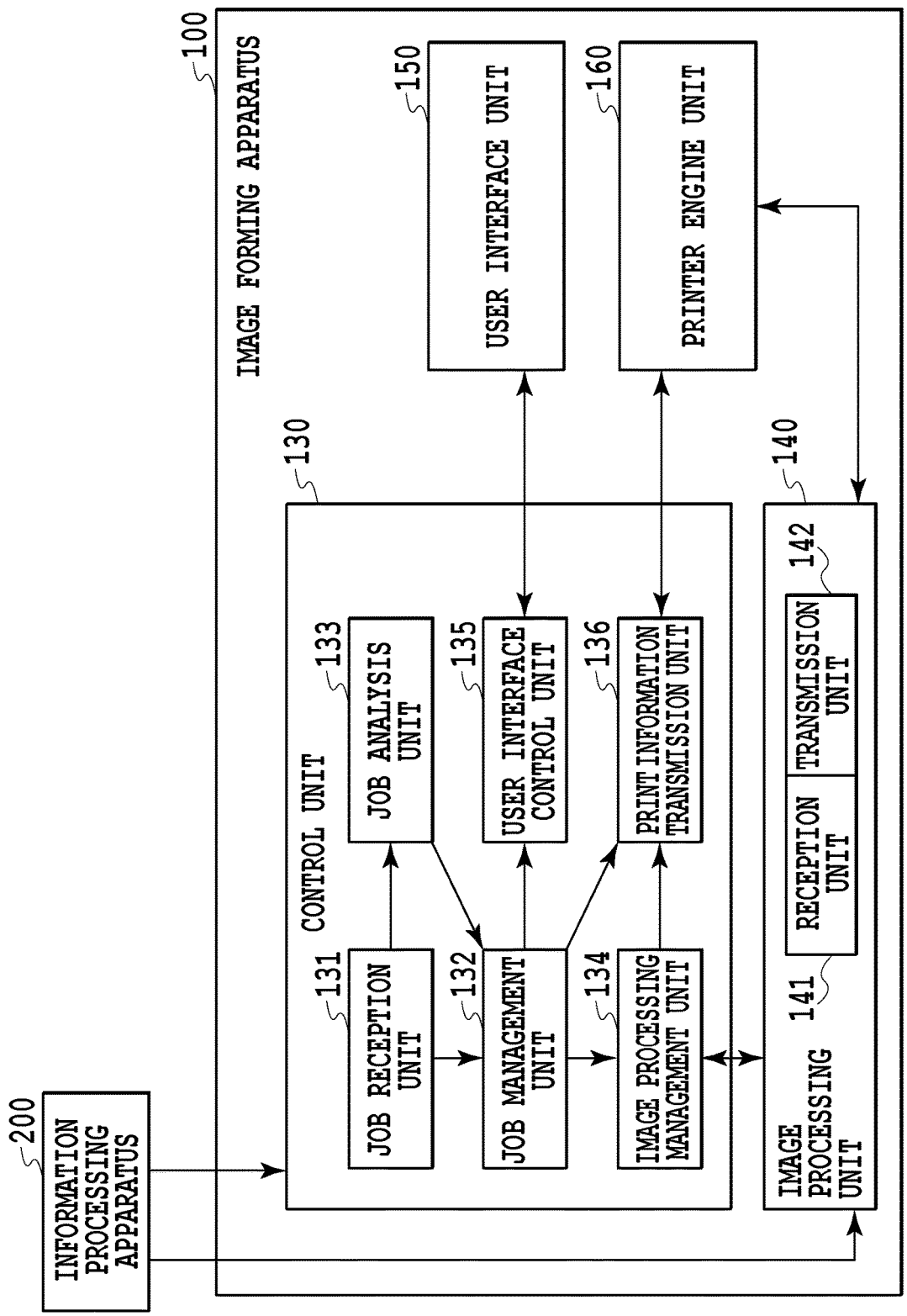
FIG. 3 is a block diagram showing an internal configuration of the image forming apparatus according to the first embodiment.

FIG. 3 is a block diagram showing an internal configuration of the image forming apparatus 100 according to the first embodiment. The image forming apparatus 100 processes a print job transmitted from the information processing apparatus 200 and prints an image on a sheet. A print job includes print setting information and print data. The print setting information includes, for example, an identifier set to the print job, the sheet size, the sheet type, the one-side/both-side printing setting, the printing resolution, and the number of colors to be printed. Further, the print setting information includes a job type indicating whether the print job is a job for printing, a job for maintenance or the like, and the color/monochrome setting. The print data is image data for each page. In one print job, one print setting and a plurality of pieces of print data corresponding to the number of pages to be printed are included.

The image forming apparatus 100 includes a control unit 130, an image processing unit 140, a user interface unit 150, and a printer engine unit 160.

The information processing apparatus 200 is a high-spec PC or server mounting software for performing RIP processing and print job control processing and generally called a digital front end. The information processing apparatus 200 receives a print job transmitted by an end user via a PC (not shown schematically) and transmits print setting information included in the print job to the control unit 130. Further, the information processing apparatus 200 performs RIP processing and the like for the print data included in the print job and transmits the print data to the image processing unit 140.

The control unit 130 of the image forming apparatus 100 includes a job reception unit 131, a job management unit 132, a job analysis unit 133, an image processing management unit 134, a user interface control unit 135, and a print information transmission unit 136. The control unit 130 generates data and a control command for performing printing based on the print setting information transmitted by the information processing apparatus 200 and instructions input by a user via the user interface unit 150.

The image processing unit 140 includes a reception unit 141 and a transmission unit 142. The image processing unit 140 receives print data transmitted by the information processing apparatus 200 and writes the print data to the reception unit 141. Further, the image processing unit 140 performs image processing for the print data written to the reception unit 141. For example, the image processing unit 140 converts the print data written to the reception unit 141 into print data dependent on the printer engine unit 160. The image processing unit 140 writes the print data for which image processing has already been performed (hereinafter, referred to as image processing already performed print data), which is generated as above, to the transmission unit 142. After this, the image processing unit 140 transmits the image processing already performed print data, which is written to the transmission unit 142, to the printer engine unit 160.

The user interface unit 150 receives instructions from a user and presents information to a user by displaying a screen and the like. The information that is presented here to a user includes the state of the image forming apparatus 100 and the printing situation for each job.

The printer engine unit 160 prints an image on a sheet based on the print setting and the control command transmitted from the control unit 130 and the print data transmitted from the image processing unit 140.

Here, the control unit 130 is explained. The job reception unit 131 receives a print job (specifically, print setting information included in the print job) from the information processing apparatus 200 and stores the print job. Further, the job reception unit 131 transmits the analysis results of the print setting information analyzed by the job analysis unit 133 to the information processing apparatus 200.

The job management unit 132 manages a print job. Specifically, the job management unit 132 instructs the print information transmission unit 136 to perform processing to generate a control command for each page based on the print setting information and processing to transmit the generated control commands to the printer engine unit 160 in a predetermined order. Further, the job management unit 132 instructs, via the image processing management unit 134, the image processing unit 140 to perform image processing for each page of the print data. Furthermore, the job management unit 132 instructs, via the image processing management unit 134, the image processing unit 140 to perform processing to transmit the image processing already performed print data (page data) to the printer engine unit 160 in a predetermined order (hereinafter, referred to as a transmission order). Still furthermore, the job management unit 132 determines the number of sheets necessary for printing based on the print setting information and generates number of sheets to be fed specifying information (hereinafter, referred to as sheet feeding number specifying information) indicating the number of sheets. As described above, the job management unit 132 controls printing processing in the printer engine unit 160 as well as the image processing unit 140 and the print information transmission unit 136. The image processing unit 140 determines a schedule of the image processing for the print data and the print data transmission processing in accordance with transmission order instructions that are input from the job management unit 132 via the image processing management unit 134. Then, the image processing unit 140 performs the image processing for the print data, performs the transmission processing via the transmission unit 142, and so on, in accordance with the determined schedule. For example, as will be described later, in the case where the printing order of the image processing already performed print data is changed after performing the image processing, the image processing unit 140 changes the transmission order by the transmission unit 142.

The job analysis unit 133 analyzes the print setting information received by the job reception unit 131 and notifies the job management unit 132 of the analysis results.

The image processing management unit 134 manages the image processing in the image processing unit 140 in accordance with the instructions from the job management unit 132. For example, the image processing management unit 134 manages the processing to receive print data performed by the image processing unit 140 and the processing to convert print data performed by the image processing unit 140. Further, the image processing management unit 134 controls the transmission order of the print data for the image processing unit 140 in accordance with the transmission order of the print data specified by the job management unit 132.

The print information transmission unit 136 generates a control command that can be interpreted by the printer engine unit 160 based on the print setting information in accordance with the instructions from the job management unit 132 and transmits the generated control commands to the printer engine unit 160 in the predetermined order.

Figure 4:
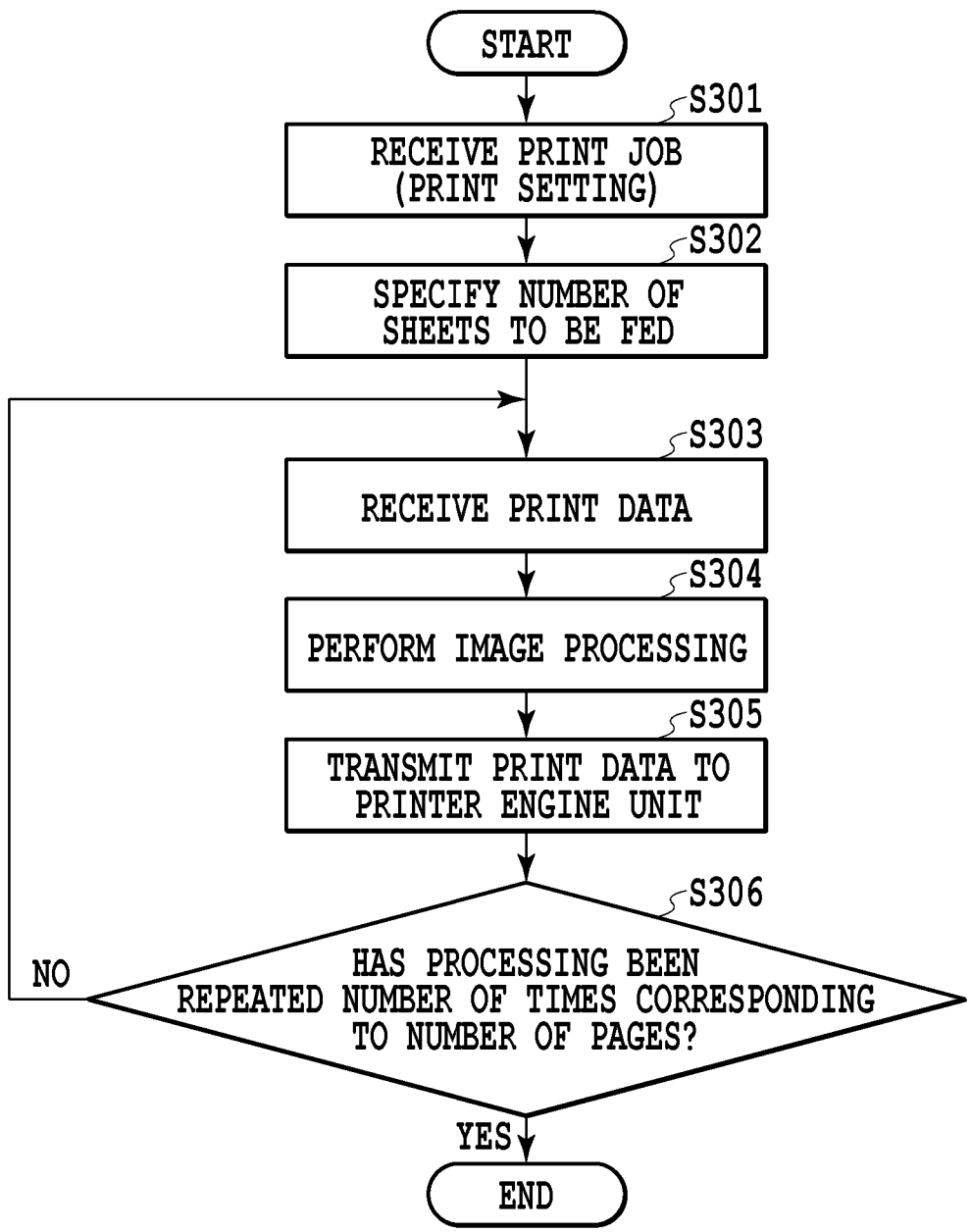
FIG. 4 is a flowchart showing the operation of the image forming apparatus according to the first embodiment.

FIG. 4 is a flowchart showing the operation of the image forming apparatus 100 according to the first embodiment.

The control unit 130 receives a print job (print setting information included in the print job) from the information processing apparatus 200 (step S301).

The control unit 130 analyzes the received print setting information and determines the number of sheets necessary for printing (step S302). Then, the control unit 130 transmits the sheet feeding number specifying information indicating the number of sheets necessary for printing to the printer engine unit 160 along with the generated control commands based on the received print setting information. Upon receipt of the sheet feeding number specifying information, the printer engine unit 160 gives instructions to feed sheets to the sheet feed device 101 so as to feed sheets in the number specified by the sheet feeding number specifying information. In the image forming apparatus 100 according to the present embodiment, in the case where instructions to feed sheets are given to the sheet feed device 101, sheet feed of the specified number of sheets and the sheet conveyance operation are performed continuously. That is, irrespective of whether or not the image processing in the image processing unit 140 for the print data included in the print job has been completed, or whether or not the image processing unit 140 has completed the reception of the print data from the information processing apparatus 200, the sheet feed of the number of sheets specified by the sheet feed instructions is performed. In the case where sheets are fed one by one each time the image processing is completed, there is a possibility that the printing operation suspends because the speed of the sheet feed operation cannot catch up with the printing speed. In contrast to this, in the present embodiment, the control unit 130 notifies in advance the sheet feed device 101 of the number of sheets to be fed in the series of processing and upon the start of printing, the sheet feed device 101 continuously feeds sheets. By the processing such as this, the image forming apparatus 100 improves the throughput of the printing processing. In the case of specifying the number of sheets to be fed, it may also be possible to specify the number of sheets to be fed for a plurality of print jobs. At this time, in the case where the number of sheets to be fed is large, it may also be possible to specify the number of sheets to be fed for each predetermined number (e.g., for each 10 sheets, 50 sheets).

In the case where the image processing unit 140 receives the print data (print data included in the print job) from the information processing apparatus 200 (step S303), the image processing unit 140 performs image processing for the received print data (step S304). This image processing is performed in accordance with the transmission order notified to the image processing management unit 134 by the job management unit 132. Then, the image processing unit 140 writes the image processing already performed print data to the transmission unit 142. It may also be possible to perform the image processing in accordance with the order of reception of the print data from the information processing apparatus 200 in place of the transmission order notified to the image processing management unit 134 by the job management unit 132. However, in this case, a certain amount of capacity is necessary in the storage area of the transmission unit 142 to which the image processing already performed print data is written.

The transmission unit 142 transmits the written image processing already performed print data to the printer engine unit 160 (step S305). At this time, the transmission of the print data by the transmission unit 142 is performed in accordance with the transmission order notified to the image processing management unit 134 by the job management unit 132 under the control of the image processing management unit 134. It may also be possible to transmit the print data to the printer engine unit 160 at the timing of the completion of image processing for each page. However, in this case, it is necessary to wait until an unused area is made in the buffer of the printer engine unit 160. Further, it may also be possible to transmit the print data corresponding to the sheet at the timing of the passing of the sheet at a predetermined location within the circulation path.

The image forming apparatus 100 performs the processing at steps S303 to S305 the number of times corresponding to the number of pages indicated by the received print job (step S306).

The reception of the print data (step S303), the image processing (step S304), and the transmission of the print data to the printer engine unit 160 (step S305) do not need to be performed sequentially. For example, in the case where there are unused areas in the storage areas of the reception unit 141 and the transmission unit 142 of the image processing unit 140, it may also be possible to asynchronously perform the processing at steps S303, S304, and S305, respectively.

Figure 5:
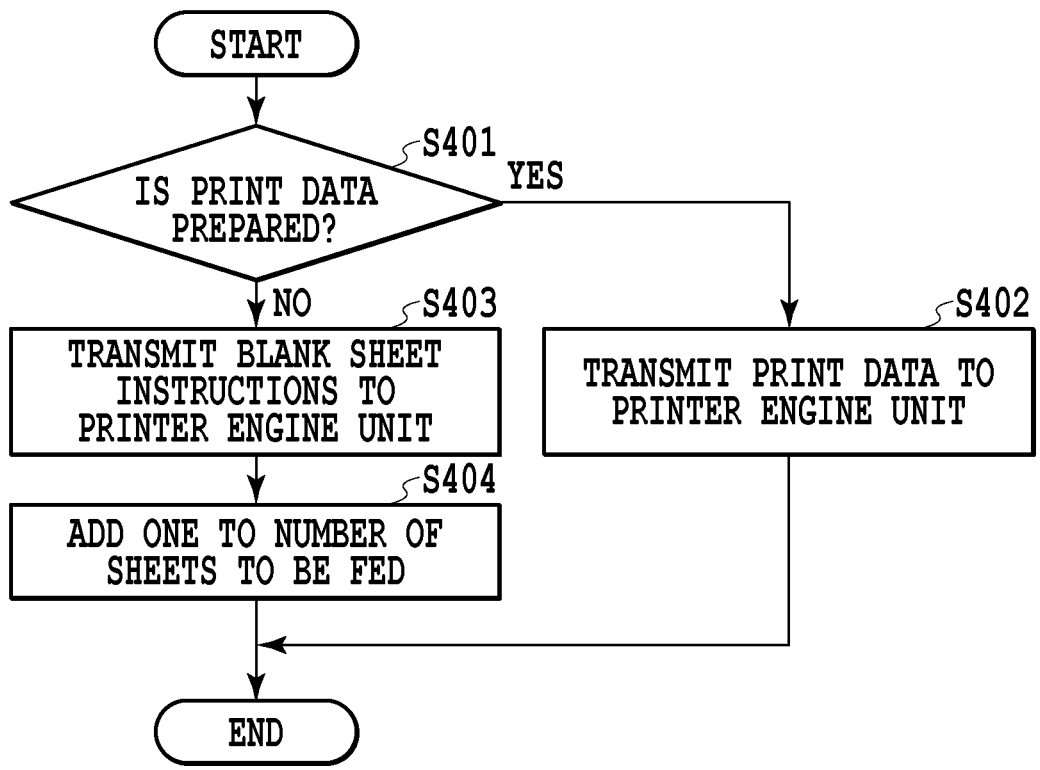
FIG. 5 is a flowchart showing an example of processing of an image processing unit in the case where print data reception processing is delayed.

FIG. 5 is a flowchart showing an example of the processing of the image processing unit 140.

As described previously, the sheet feed device 101 in the image forming apparatus 100 according to the present embodiment does not feed sheets one by one each time the image processing is completed, but continuously feeds sheets in the number specified by the sheet feeding number specifying information. Consequently, the sheet feed corresponding to the number of sheets specified by the sheet feeding number specifying information and the sheet conveyance operation are performed continuously. Because of this, in the case where the print data reception processing in the reception unit 141 of the image processing unit 140 is delayed, there is a possibility that a situation may occur in which the image processing already performed print data corresponding to the sheet conveyed to under the print head 105 does not exist in the printer engine unit 160. A control method of dealing with such a situation is explained below. As an example in which the preparation of print data is not completed in time, mention is made of the case where the reception of print data in the reception unit 141 of the image processing unit 140 is delayed and the case where the image processing in the image processing unit 140 is delayed. It is also possible to deal with the case where the preparation of print data is not completed in time due to other reasons by the processing shown in FIG. 5.

In the processing to transmit print data to the printer engine unit 160 (step S305 in FIG. 4), the image processing unit 140 checks whether the preparation of the print data for printing of the next sheet is completed (step S401). Specifically, the image processing unit 140 checks whether the image processing already performed print data exists in the transmission unit 142. It is necessary for this check to be performed by the conveyance of the sheet to under the print head 105 is completed. For example, it may also be possible to check whether the image processing already performed print data corresponding to the sheet exists in the transmission unit 142 by the point in time of the passing of the sheet at a predetermined location within the circulation path. Alternatively, for example, it may also be possible to check whether the image processing already performed print data exists in the transmission unit 142 within a predetermined time from the previous transmission of the print data.

In the case where the image processing already performed print data exists in the transmission unit 142 (YES at step S401), the transmission unit 142 transmits the print data to the printer engine unit 160 (step S402).

In the case where the image processing already performed print data does not exist in the transmission unit 142 (NO at step S401), the image processing unit 140 transmits blank sheet instructions, which are information for leaving the sheet conveyed to under the print head 105 as a blank sheet, to the printer engine unit 160 (step S403). The blank sheet instructions are instructions to leave the sheet conveyed to under the print head 105 as a blank sheet, i.e., instructions to skip the printing processing for the sheet. It is also possible for the image processing unit 140 to transmit blank sheet data as print data in place of giving blank sheet instructions. For example, blank sheet data is print data not including an image object.

In the case where the printing for the sheet conveyed to under the print head 105 is skipped, an excess sheet is used as a result. Consequently, it is necessary to instruct the sheet feed device 101 to feed a sheet so as to prevent a sheet shortage. Consequently, the image processing unit 140 gives instruction to increase the number of sheets to be fed to the sheet feed device 101 via the job management unit 132 (step S404). Specifically, the job management unit 132 notifies the sheet feed device 101 of the number of sheets to be fed having become necessary due to the skipping of printing based on the instructions of the image processing unit 140. Upon receipt of the notification from the job management unit 132, the sheet feed device 101 continues to feed sheets until the feed sheet in the number corresponding to the updated number of sheets to be fed obtained by adding the notified number of sheets to be fed to the number of sheets to be fed specified by the sheet feeding number specifying information is completed.

Due to this, in the case where the print data based on the print job is not prepared in time for the fed sheet, the printing for the sheet is skipped (printing is not performed) and in the stage where the print data is prepared, the printing using the print data based on the print job is performed for the sheet. For example, in the case where the print data is prepared in time for the second sheet that follows the first sheet scheduled to be printed, the second sheet is printed as a result. Then, in the case where the print data for the second sheet is also not prepared in time, but the print data for the third sheet that follows the second sheets is prepared in time, the third sheet is printed as a result.

Figure 6:
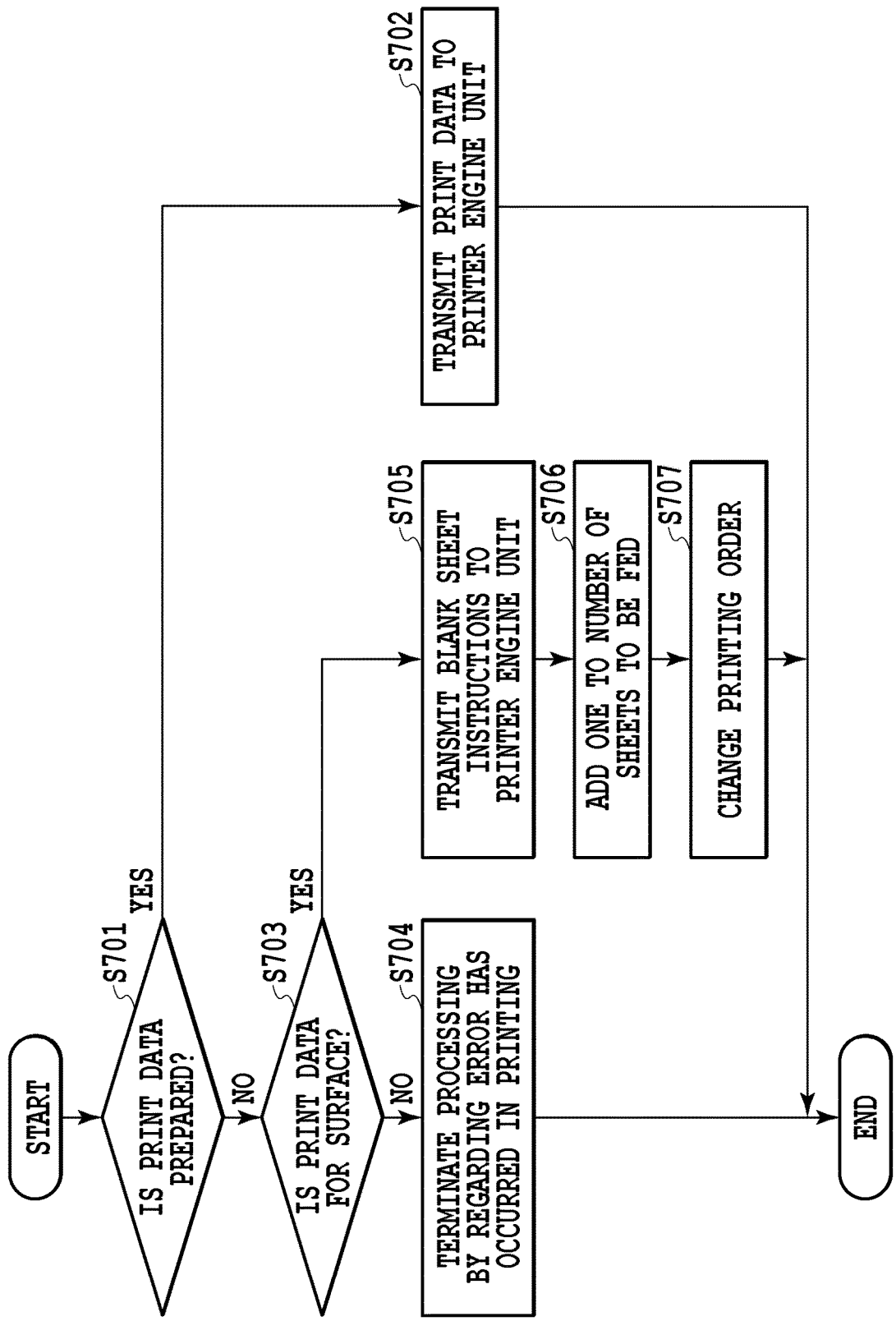
FIG. 6 is a flowchart showing an example of processing of the image processing unit in the case where the print data reception processing is delayed at the time of both-side printing.

FIG. 6 is a flowchart showing an example of the processing of the image processing unit 140 at the time of both-side printing.

In the processing to transmit print data to the printer engine unit 160 (step S305), the image processing unit 140 checks whether the print data for the printing of a sheet of interest is already prepared (step S701). Specifically, the image processing unit 140 checks whether the image processing already performed print data exists in the transmission unit 142. The sheet of interest is a sheet having passed a predetermined location on the side behind the print head 105 in the advance direction within the circulation path. It is possible to detect that the sheet has passed by providing a sensor in the circulation path.

In the case where the image processing already performed print data for the printing of the sheet of interest exists in the transmission unit 142 (YES at step S701), the print data is transmitted to the printer engine unit 160 by the transmission unit 142 (step S702).

In the case where the image processing already performed print data for the printing of the sheet of interest does not exist in the transmission unit 142 (NO at step S701), the image processing unit 140 determines whether or not the print data for the printing of the sheet of interest is print data for the surface (step S703). Specifically, the image processing unit 140 determines whether the print data for the sheet of interest is print data for the surface or print data for the backside based on the schedule described previously.

In the case where the print data necessary for the printing of the sheet of interest is print data for the backside (NO at step S703), the image processing unit 140 terminates the processing by regarding that an error has occurred without transmitting the blank sheet instructions to the printer engine unit 160 (step S704). The reason is that in the case where the backside cannot be printed for the sheet whose surface has already been printed, the printed matter to be output is not regarded as being a product. At step S704, error processing to discharge the sheet only the surface of which has been printed to the sheet disposal tray 112 as an error sheet is further performed. Further, it may also be possible to insert the print data (print data for the surface and print data for the backside) again as an interrupt print job at appropriate timing so that the page whose print data for the backside has not been prepared in time can be printed.

In the case where the print data necessary for the printing of the sheet of interest is print data for the surface (YES at step S703), the image processing unit 140 transmits blank sheet instructions to the printer engine unit 160 so as to leave the sheet conveyed to under the print head 105 as a blank sheet (step S705). It may also be possible for the image processing unit 140 to transmit blank sheet data as print data in place of blank sheet instructions.

Because of skipping the printing for the sheet conveyed to under the print head 105, the image processing unit 140 transmits instructions to cause the sheet feed device 101 to increase the number of sheets to be fed to the job management unit 132 (step S706). Further, it is necessary for the image processing unit 140 to change the subsequent printing order because of skipping the printing. Consequently, the image processing unit 140 performs processing to change the printing order. First, the image processing unit 140 transmits instructions to change the subsequent printing order to the job management unit 132. In response to this, the job management unit 132 determines the transmission order again. That is, the job management unit 132 rearranges the printing order. Then, the image processing management unit 134 controls the image processing unit 140 based on the transmission order determined by the job management unit 132. Due to this, the order of the print data to be transmitted to the printer engine unit 160 from the image processing unit 140 is changed. The change in order referred to here means not only to change the order of the printing of the surface but also to change the order of the printing of the backside. That is, in the case where the printing for the sheet conveyed in the state where the surface of the sheet faces upward is skipped, the sheet passes the circulation path again and is conveyed in the state where the backside faces upward, and therefore, the printing order is changed so that the printing of the backside is also skipped. At this time, scheduling is performed so that the correspondence between the image formed on the surface and the image formed on the backside of each sheet coincides with the correspondence specified by the print job. A specific example will be described later.

There is a case where the print data already transmitted to the printer engine unit 160 or the printing processing in the printer engine unit 160 may be affected by the change in the printing order. In this case, it is necessary for the image processing unit 140 to transmit instructions to change the printing order to the printer engine unit 160 or it is necessary for the image processing unit 140 to perform processing to cancel the printing corresponding to the print data already transmitted to the printer engine unit 160 and processing to retransmit the print data corresponding to the changed printing order. The above-described processing for the printer engine unit 160 needs to be performed before the sheet to be printed is conveyed to under the print head 105.

Further, in the case where the print data for the backside does not exist at step S704, the image processing unit 140 terminates the processing by regarding that an error has occurred, but by guaranteeing that the print data for the backside exists at the time of performing the printing of the surface, it is possible to avoid the error. That is, at the time of checking whether the image processing already performed print data exists in the transmission unit 142 at step S701, it may also be possible to take that both the print data for the surface and the print data for the backside exist to be the condition of the determination. Due to this, it is possible to avoid the situation in which the surface can be printed but the backside cannot be printed. However, in this case, the possibility that it is determined that the print data does not exist at step S701 becomes stronger and the possibility that the case where a blank sheet is inserted increases in number.

Figure 7:
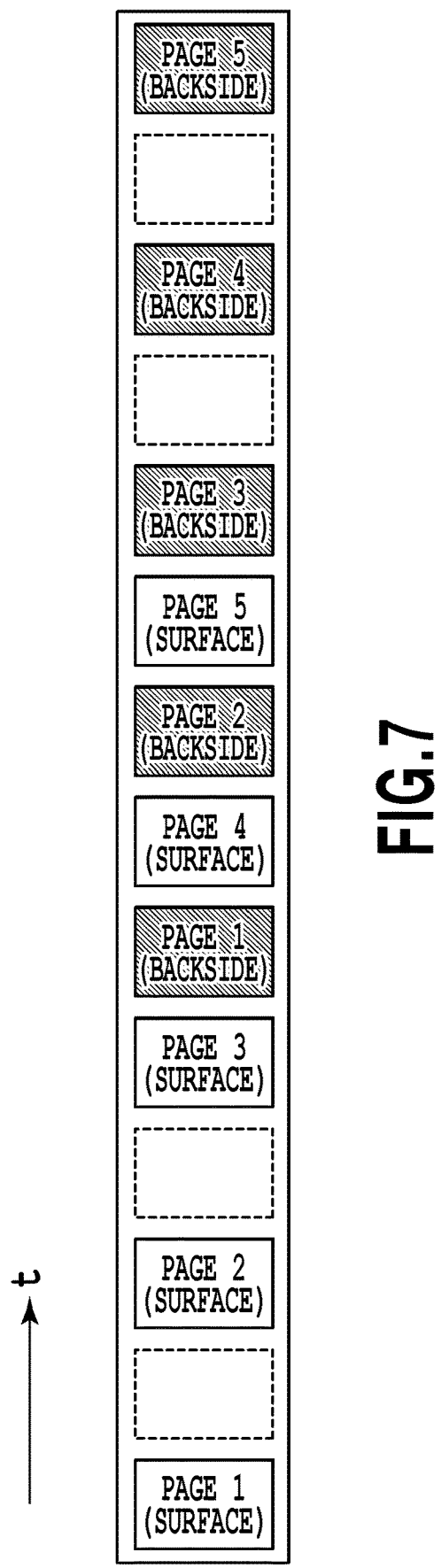
FIG. 7 is a schematic diagram showing an example of a printing order at the time of both-side printing.
Figure 8:
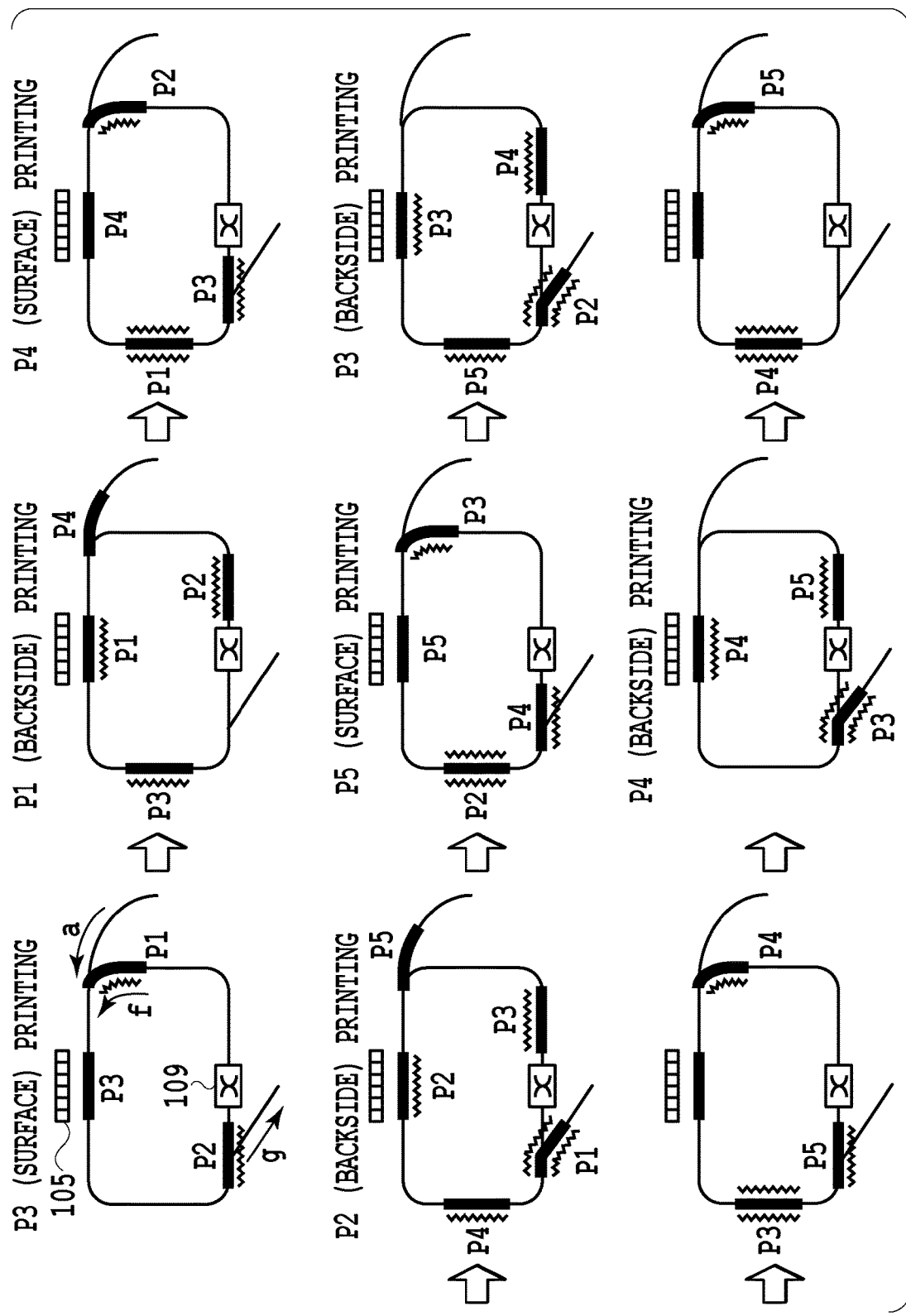
FIG. 8 is a diagram showing the way a sheet is circulated within a circulation path in accordance with the printing order shown in FIG. 7.

FIG. 7 is a schematic diagram showing an example of the printing order at the time of both-side printing by sheet circulation. In FIG. 7, for example, page 1 (surface) indicates the printing processing of the surface of page 1. Further, an arrow t in FIG. 7 indicates that the printing processing is performed in order toward the rightward direction in FIG. 7. Furthermore, in FIG. 7, a rectangle indicated by a broken line indicates a section in which sheet feed is not performed in order to cause a predetermined number of sheets (here, three) to appropriately circulate at predetermined intervals, i.e., a section in which printing processing is not performed. FIG. 8 is a diagram showing the way sheets are circulated within the circulation path in accordance with the printing order shown in FIG. 7. FIG. 8 shows the way from the start of the printing processing of the surface of page 3 until the printing processing of the backside of page 4 is completed. In FIG. 8, for example, "P1" indicates page 1. Further, each elongated black rectangle shown on the circulation path indicates the way the sheet that is conveyed is viewed from the side. Characters attached to the sheet, for example, "P1" indicates that the sheet is the sheet corresponding to page 1. A wavy line attached along the sheet indicates that an image is formed on the surface or the backside of each sheet by the print head 105.

The job management unit 132 schedules the printing order for each sheet so as to prevent the printing processing from being suspended unnecessarily and to prevent the sheet conveyance from being suspended unnecessarily. For example, in the case where both-side printing is performed for five sheets by circulating three sheets within the circulation path shown in FIG. 1, the job management unit 132 schedules the printing order so that printing is performed in the order shown in FIG. 7. That is, the transmission order of each piece of print data is "page 1 (surface)"→"page 2 (surface)"→"page 3 (surface)"→"page 1 (backside)"→"page 4 (surface)"→"page 2 (backside)"→"page 5 (surface)"→"page 3 (backside)"→"page 4 (surface)"→"page 5 (backside)". In the present embodiment, as shown in FIG. 7, the printing of the surface and the printing of the backside are performed alternately. In other words, the sheet fed from the sheet feed device 101 and the sheet that circulates the circulation path for the second time are conveyed alternately to under the print head 105. First, the job management unit 132 determines the transmission order of the print data based on the print setting information and notifies the image processing management unit 134 of the transmission order. Then, the image processing management unit 134 controls the print data transmission processing in the image processing unit 140 (specifically, the transmission unit 142) based on the transmission order notified by the job management unit 132. By the control such as this, as shown in FIG. 8, the printing processing and the sheet conveyance are continued without suspension.

As shown in FIG. 7 and FIG. 8, after the surface of page 1 is conveyed to under the print head 105, a width corresponding to one page is spaced and the surface of page 2 is conveyed and a width corresponding to one page is spaced and the surface of page 3 is conveyed. As shown in FIG. 8, at the timing at which the surface of page 3 passes under the print head 105, page 1 passes through the conveyance path in the state where page 1 is reversed by the sheet reversion device 109 and the backside faces upward. Then, after the backside of page 1 is conveyed to under the print head 105, the surface of page 4 newly fed, the backside of page 2, the surface of page 5 newly fed, and the backside of page 3 are conveyed in this order. After this, the backside of page 4 and the backside of page 5 are conveyed in this order.

Figure 9:
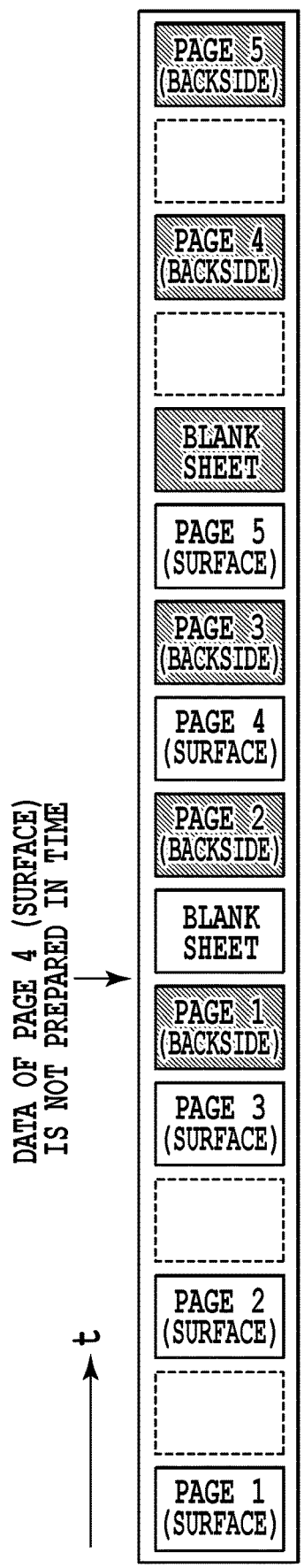
FIG. 9 is a schematic diagram showing an example of a printing order in the case where a blank sheet is inserted.
Figure 10:
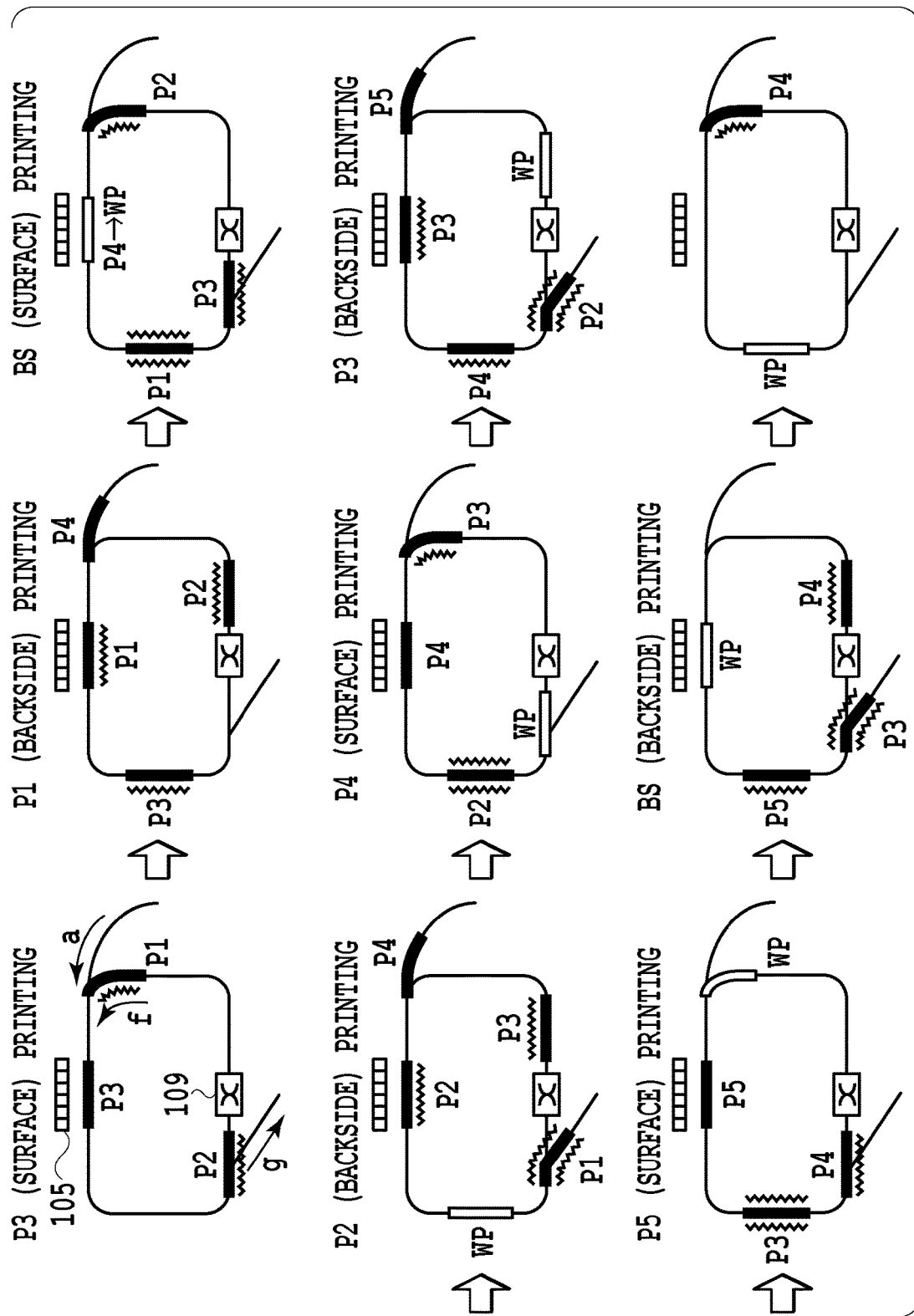
FIG. 10 is a diagram showing the way a sheet is circulated within the circulation path in accordance with the printing order shown in FIG. 9.

FIG. 9 is a schematic diagram showing an example of the printing order in the case where a blank sheet is inserted. FIG. 9 shows the printing order in the case where the transmission of the print data of the surface of page 4 is not performed in time at the time of performing both-side printing for five sheets by circulating three sheets within the conveyance path shown in FIG. 1. In FIG. 9, the "blank sheet" that is not shaded indicates the printing processing based on blank sheet data, which is performed for the surface of the sheet. The "blank sheet" that is shaded indicates the printing processing based on blank sheet data, which is performed for the backside of the sheet whose surface is left as a blank sheet. FIG. 10 is a diagram showing the way sheets circulate within the circulation path in accordance with the printing order shown in FIG. 9. FIG. 10 shows the way from the start of the printing processing of the surface of page 3 until the printing processing of the backside of the blank sheet page is completed. In FIG. 10, "BS" indicates a blank sheet.

In the case where the print data of the surface of page 4 is not prepared in time, at the timing at which the print data of the surface of page 4 should originally be transmitted, the image processing unit 140 transmits blank sheet instructions to the printer engine unit 160. Further, the printing order is rescheduled by the job management unit 132. At this time, the job management unit 132 reschedules the printing order so that the printing processing and the sheet conveyance are continued without suspension as shown in FIG. 9. In the example shown in FIG. 9, the transmission order of each piece of print data to be transmitted after the inserted blank sheet data is changed to "page 2 (backside)"→"page 4 (surface)"→"page 3 (backside)"→"page 5 (surface)"→"blank sheet"→"page 5 (backside)". That is, the printing order of the print data is changed and at the same time, blank sheet data for the backside is newly inserted. By the job management unit 132 rescheduling the printing order as described above, even in the case where the printing processing is skipped by blank sheet instructions, it is made possible to continue the printing processing and the sheet conveyance without suspension as shown in FIG. 10. In the case where printing is not performed in time, more sheets are fed that those in the feed sheet processing in the case where printing is performed in time.

As above, in the present embodiment, in the case where the preparation of the print data corresponding to the sheet conveyed to under the print head is not completed in time in the image forming apparatus that performs printing by circulating sheets within the conveyance path, blank sheet data is inserted and the printing for the sheet is skipped. At this time, in the circulation path, the surface and the backside are conveyed alternately, and therefore, rather than simply skipping the printing, the arrangement order itself of the image data is changed by performing change processing of the printing order. According to the present embodiment, even in the case where the preparation of the print data is not completed in time, it is made possible to continue the printing processing (ejection of ink in the ink jet scheme and transfer of toner in the electrophotographic scheme) without suspension. Further, the printing processing is not suspended, and therefore, it is also possible to continue the sheet conveyance without suspension. In the case where a sheet is made to stop in the conveyance path because the preparation of print data is not completed in time, there is a possibility that the sheet is folded or the sheet is heated by the drying unit depending on the stop position. However, in the present embodiment, the sheet conveyance is not suspended even in the case where the preparation of print data is not completed in time, and therefore, complicated control or the cost to make a sheet stop at an appropriate position is not necessary.

There is a method of avoiding the suspension of printing processing by starting the printing processing after the preparation of all print data is completed. However, with this method, a storage area to save all print data is necessary and in addition to that, there is a possibility that the throughput of the printing processing is reduced. On the other hand, in the present embodiment, the print data corresponding to each sheet conveyed to under the print head is generated in accordance with the conveyance timing of each sheet, and therefore, it is possible to suppress the storage area to save the print data to a minimum. Further, the throughput of printing processing is not reduced more than necessary.

Furthermore, in the present embodiment, in the case where blank sheet data is inserted at the time of both-side printing, as shown in FIG. 9 or FIG. 10, the subsequent printing order is changed so that the consistency between the surface and the backside is kept. Consequently, even in the case where the preparation of print data is not completed in time at the time of both-side printing, it is possible to continue the printing processing without suspension and to appropriately complete a print job.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in the continuous printing that is performed by continuously feeding sheets, even in the case where the preparation of print data is not completed in time, it is possible to continue the printing processing without suspension.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-107865, filed May 30, 2016, which is hereby incorporated by reference wherein in its entirety.

What is claimed is:

1. An image forming apparatus, comprising:
a memory including instructions; and
at least one processor for executing the instructions to cause the image forming apparatus to act as:
(1) a generation unit configured to perform image processing so as to generate page data for each of a plurality of pages, based on a print job;
(2) a specifying unit configured to specify, based on a print setting of the print job, the number of sheets to be fed from a feeding unit;
(3) a determination unit configured to determine whether page data corresponding to a sheet passing a predetermined location of a conveyance path is prepared in time; and
(4) a control unit configured to perform, in a case where the determination unit determines that the page data is not prepared in time, control for leaving the sheet as a blank sheet, whereby a print unit does not perform printing,
wherein continuous feeding of a plurality of sheets corresponding to the specified number of sheets is started, regardless of whether all of the page data is generated or not,
in a case where the print setting of the print job is both-side printing and page data of a nth page for a surface is not determined to be prepared in time, the control unit performs control for changing a surface and a backside of a sheet, on which an image based on the page data of the nth page for the surface and an image based on page data of the nth page for the backside have been scheduled to be printed, into blank pages, respectively, and
from the blank page for the surface to the blank page for the backside, the control unit does not change pages for the backside and changes a page order such that pages for the surface to be inserted between the respective pages for the backside are shifted by one page, whereby the print unit alternately performs printing for the surface and printing for the backside.

2. The image forming apparatus according to claim 1, wherein the control unit notifies the sheet feed device of a number of sheets left as a blank sheet by not performing processing to form an image.

3. The image forming apparatus according to claim 2, wherein the sheet feed device continues sheet feed until sheet feed corresponding to a number of sheets obtained by adding the number of sheets notified by the control unit to the number of sheets to be fed is completed.

4. The image forming apparatus according to claim 1, wherein the control unit changes, in a case of leaving a sheet as a blank sheet by not performing processing to form an image, the page order of pages that is to be printed following the blank sheet so that the processing to form an image is performed for another sheet.

5. The image forming apparatus according to claim 1, wherein the control unit does not perform processing to form an image by inserting blank sheet data.

6. The image forming apparatus according to claim 1, wherein the control unit does not perform, in a case where a print setting specified by the print job is both-side printing and the determination unit determines that the page data is not prepared in time, processing to form an image for the backside of the sheet as well as performing control to leave the surface of the sheet as a blank sheet by not performing processing to form an image for the surface of the sheet.

7. The image forming apparatus according to claim 6, wherein the control unit changes, in a case where a print setting specified by the print job is both-side printing and the surface of a sheet is left as a blank sheet by not performing processing to form an image, the printing order so that correspondence between an image formed on the surface and an image formed on the backside of each sheet coincides with the correspondence specified by the print job.

8. The image forming apparatus according to claim 1, wherein the instructions are further executed to cause the image forming apparatus to act as:
a reversion unit configured to reverse a sheet that has passed the predetermined location of the conveyance path and on the surface of which an image is formed, wherein the conveyance path includes the circulation path that circulates a sheet and a sheet reversed by the reversion unit is conveyed again to the predetermined location.

9. The image forming apparatus according to claim 8, wherein the control unit performs error processing in a case where image data corresponding to the backside of the sheet is not generated by the generation unit at the time at which a sheet reversed by the reversion unit passes the predetermined location of the conveyance path.

10. The image forming apparatus according to claim 1, wherein in a case where the print setting of the print job is both-side printing, and the page order in the image data is arranged in the order of the nth page for the surface, the mth page for the backside, with n>m, the n+1th page for the surface, and the m+1th page for the backside, the control unit performs, upon determining that the nth page for the surface is not prepared in time, control to leave a sheet scheduled to be printed with an image based on the page data of the nth page for the surface as a blank sheet, and changes the page order after the blank sheet in the order of the mth page for the backside, the nth page for the surface, the m+1th page for the backside, and the n+1th page for the surface.

11. The image forming apparatus according to claim 1, further comprising a specifying unit configured to specify a number of sheets to be fed by the sheet feed device based on the print job before printing is performed based on the print job,
wherein in a case where the control unit performs the control to leave the sheet as a blank, a number of the blank sheets is added to the number of sheets specified by the specifying unit.

12. The image forming apparatus according to claim 1, wherein, in a case where a print setting of the print job is both-side printing, page data corresponding to a sheet passing the predetermined location includes page data for the surface and page data for the backside.

13. The image forming apparatus according to claim 1, wherein only printing for the surface is continuously performed before a leading sheet passes through a circulation path and reaches the print unit.

14. An image forming method in an image forming apparatus, the method comprising:
performing image processing so as to generate page data for each of a plurality of pages, based on a print job;
specifying, based on a print setting of the print job, the number of sheets to be fed from a feeding unit;
determining whether page data corresponding to a sheet passing a predetermined location of a conveyance path is prepared in time; and
performing, in a case where it is determined that the page data is not prepared in time at the determining step, control for leaving the sheet as a blank sheet, whereby a print unit does not perform printing,
wherein continuous feeding of a plurality of sheets corresponding to the specified number of sheets is started, regardless of whether all of the page data is generated or not,
in a case where the print setting of the print job is both-side printing and page data of a nth page for a surface is not determined to be prepared in time, the control unit performs control for changing a surface and a backside of a sheet, on which an image based on the page data of the nth page for the surface and an image based on page data of the nth page for the backside have been scheduled to be printed, into blank pages, respectively, and
from the blank page for the surface to the blank page for the backside, the control unit does not change pages for the backside and changes a page order such that pages for the surface to be inserted between the respective pages for the backside are shifted by one page, whereby the print unit alternately performs printing for the surface and printing for the backside.

15. A non-transitory computer readable storage medium storing a program for causing a computer to perform an image forming method in an image forming apparatus, the method comprising:
performing image processing so as to generate page data for each of a plurality of pages, based on a print job;
specifying, based on a print setting of the print job, the number of sheets to be fed from a feeding unit;
determining whether page data corresponding to a sheet passing a predetermined location of a conveyance path is prepared in time; and
performing, in a case where it is determined that the page data is not prepared in time at the determining step, control for leaving the sheet as a blank sheet, whereby a print unit does not perform printing,
wherein continuous feeding of a plurality of sheets corresponding to the specified number of sheets is started, regardless of whether all of the page data is generated or not,
in a case where the print setting of the print job is both-side printing and page data of a nth page for a surface is not determined to be prepared in time, the control unit performs control for changing a surface and a backside of a sheet, on which an image based on the page data of the nth page for the surface and an image based on page data of the nth page for the backside have been scheduled to be printed, into blank pages, respectively, and
from the blank page for the surface to the blank page for the backside, the control unit does not change pages for the backside and changes a page order such that pages for the surface to be inserted between the respective pages for the backside are shifted by one page, whereby the print unit alternately performs printing for the surface and printing for the backside.

* * * * *